United States Patent
Song et al.

(10) Patent No.: US 8,780,045 B2
(45) Date of Patent: Jul. 15, 2014

(54) OPTICAL NAVIGATION WITH A DYNAMIC SQUAL THRESHOLD

(75) Inventors: Willie Song, Penang (MY); Siew Chin Lee, Penang (MY); Keng Yeen Lye, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 658 days.

(21) Appl. No.: 12/950,939

(22) Filed: Nov. 19, 2010

(65) Prior Publication Data

US 2012/0127076 A1    May 24, 2012

(51) Int. Cl.
 G06F 3/033    (2013.01)
 G09G 5/08    (2006.01)

(52) U.S. Cl.
 USPC .......................................... 345/166; 345/163

(58) Field of Classification Search
 USPC ....................................................... 345/166
 See application file for complete search history.

(56) References Cited

U.S. PATENT DOCUMENTS

| | | | |
|---|---|---|---|
| 7,193,203 B1 * | 3/2007 | Mau et al. ................... | 250/221 |
| 7,613,329 B2 * | 11/2009 | Grewal et al. ............... | 382/107 |
| 7,746,324 B2 | 6/2010 | Gates et al. | |
| 8,358,271 B2 * | 1/2013 | Song et al. ................... | 345/166 |
| 2005/0253812 A1 * | 11/2005 | Lin et al. ...................... | 345/163 |
| 2006/0007155 A1 * | 1/2006 | Raynor et al. ................ | 345/166 |
| 2006/0086712 A1 | 4/2006 | Feldmeier | |
| 2006/0132443 A1 * | 6/2006 | Chien Wu .................... | 345/166 |
| 2006/0187208 A1 | 8/2006 | Wenstrand et al. | |
| 2007/0291001 A1 * | 12/2007 | Trisnadi et al. .............. | 345/166 |
| 2008/0061219 A1 * | 3/2008 | Lee et al. ..................... | 250/221 |
| 2009/0195503 A1 | 8/2009 | Lee et al. | |
| 2010/0201626 A1 | 8/2010 | Krah et al. | |
| 2011/0310018 A1 * | 12/2011 | Song et al. ................... | 345/166 |

* cited by examiner

*Primary Examiner* — Alexander S Beck
*Assistant Examiner* — Mihir Rayan

(57) ABSTRACT

A system and method for tracking movement between a surface and an optical navigation device are described. In an embodiment, the optical navigation device has an image sensor that includes an array of pixels and motion tracking involves acquiring image information, the image information including pixel values that correspond to the pixels, calculating a surface quality (SQUAL) value from the image information, determining a level of saturation of the pixel array from pixel values of the image information, comparing the determined level of saturation of the pixel array to a saturation threshold, increasing a SQUAL threshold if the determined level of saturation of the pixel array is greater than the saturation threshold, and deciding whether or not to output motion tracking information in response to a comparison of the SQUAL value to the SQUAL threshold. Other embodiments of the method are also described.

13 Claims, 6 Drawing Sheets

| Initial SQUAL threshold | Value of Maximum_Pixel-Average_Pixel | Adjusted SQUAL threshold |
|---|---|---|
| 8 | 45 or less | 8 |
| 8 | 46 - 75 | 48 |
| 8 | 76 - 110 | 60 |
| 8 | 111 or more | 80 |

OPTICAL NAVIGATION WITH A DYNAMIC SQUAL THRESHOLD

BACKGROUND

Movement between a surface and an optical navigation device may be tracked by 1) using an image sensor to acquire a series of digital images of the surface, 2) comparing successive ones of the series of digital images, and 3) analyzing differences in the successive images to quantify movement between the surface and the optical navigation device. Depending on the algorithm(s) used to analyze the differences in the successive images, it may be possible to quantify direction, velocity and other characteristics of movement.

Typically, an optical navigation device includes a light source that illuminates the surface with a uniform light of known wavelength. In some cases, the light source may be a light-emitting diode (LED) or laser diode. The light source is mounted such that its light is ideally reflected from the surface to the image sensor. As a result of irregularities found in most surfaces (such as contour, color and composition irregularities), different portions of a surface will typically reflect light in different amounts and at different angles. This, in turn, leads to different amounts of light being detected by different individual pixels of the image sensor. Movements between the surface and the image sensor lead to movements in the overall pattern of light detected by pixel elements of the image sensor, which movements are used to track movement between the surface and the optical navigation device. The tracked movements can then be translated to movement of a cursor on a display of a computing device.

When the optical navigation device is lifted from the surface, it is usually desirable for movement of the cursor to cease. However, for various reasons, a cursor may exhibit unwanted movement even though the optical navigation device is lifted from the surface.

SUMMARY

Embodiments of a method are described. In one embodiment, the method is a method for tracking movement between a surface and an optical navigation device, the optical navigation device having an image sensor that includes an array of pixels. The method involves acquiring image information, the image information including pixel values that correspond to the pixels, calculating a surface quality (SQUAL) value from the image information, determining a level of saturation of the pixel array from pixel values of the image information, comparing the determined level of saturation of the pixel array to a saturation threshold, increasing a SQUAL threshold if the determined level of saturation of the pixel array is greater than the saturation threshold, and deciding whether or not to output motion tracking information in response to a comparison of the SQUAL value to the SQUAL threshold. Other embodiments of the method are also described.

Embodiments of another method are described. In one embodiment, the method is a method for tracking movement between a surface and an optical navigation device, the optical navigation device having an image sensor that includes an array of pixels. The method involves setting a SQUAL threshold, acquiring image information from the image sensor, the image information including pixel values that correspond to the pixels, obtaining at least one characteristic of the image information, calculating a SQUAL value from the image information, deciding whether or not to increase the SQUAL threshold in response to the characteristic of the image information, after it is decided whether or not to increase the SQUAL threshold, comparing the SQUAL value to the SQUAL threshold, and deciding whether or not to output motion tracking information in response to the comparison. Other embodiments of the method are also described.

Embodiments of an optical navigation device are also described. In an embodiment, the optical navigation device includes an image sensor, a SQUAL threshold management engine, and a motion tracking engine. The image sensor outputs image information, the image sensor having an array of pixels that generate corresponding pixel values. The SQUAL threshold management engine is configured to determine a level of saturation of the pixel array from the pixel values of the image information, compare the determined level of saturation to a saturation threshold, and increase a SQUAL threshold if the determined level of saturation is greater than the saturation threshold. The motion tracking engine is configured to generate a SQUAL value from the image information, compare the SQUAL value to the SQUAL threshold, output motion tracking information if the SQUAL value is above the SQUAL threshold, and suspend the output of motion tracking information if the SQUAL value is below the SQUAL threshold. Other embodiments of the optical navigation device are also described Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
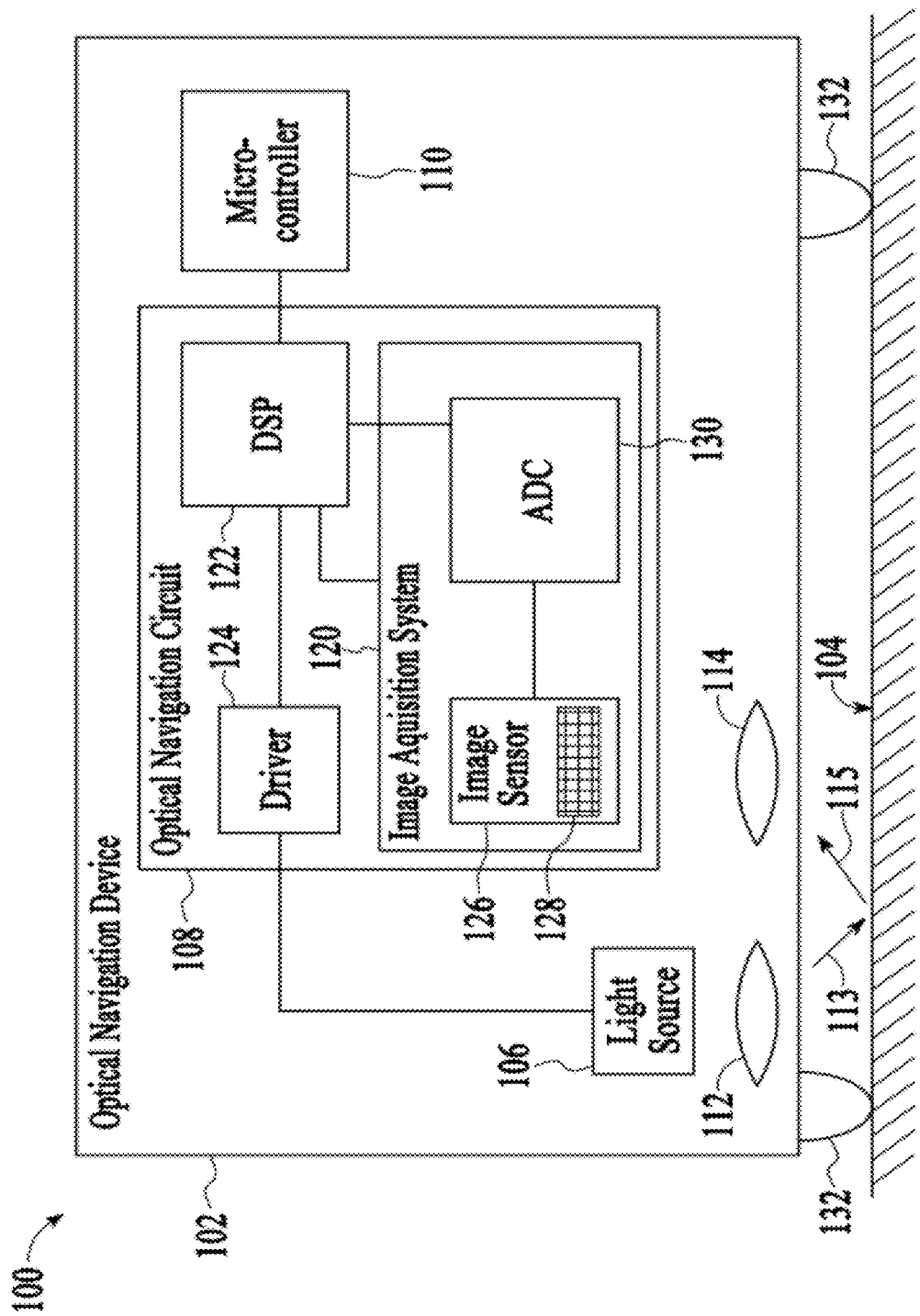
FIG. 1 depicts a schematic block diagram of one embodiment of an optical navigation system.

FIG. 1 depicts a schematic block diagram of one embodiment of an optical navigation system 100. The illustrated optical navigation system 100 includes an optical navigation device 102, such as an optical mouse, relative to a navigation surface 104. In operation, the optical navigation device 102 sits on the navigation surface 104 and illuminates portions of the navigation surface 104 in order to generate images of the illuminated portions of the navigation surface 104. More specifically, the optical navigation device 102 moves relative to the navigation surface 104 and generates one or more navigation signals representative of the movement of the optical navigation device 102 relative to the navigation surface 104. Hence, the navigation surface 104 also may be referred to as an illumination surface or simply a "surface." Additionally, since the navigation surface 104 is used to track the movement of the optical navigation device 102, the navigation surface 104 also may be referred to as a tracking surface.

In order to illuminate the navigation surface 104, the optical navigation device 102 emits light that is at least partially reflected by the navigation surface 104. The optical navigation device 102 detects at least a portion of the reflected light and processes the detected portion to generate the navigation signals. Examples of how the navigation signals may be generated are described in more detail below.

The navigation surface 104 may be any type of surface and may include one or more types of material compositions. Examples of typical navigation surfaces 104 include wood, stone, or plastic laminate desktops, as well as paper, fabric, or other textured navigation pads (e.g., a mouse pad). Some types of navigation surfaces 104 are highly specular so that most of the light incident on the navigation surface 104 is specularly reflected and only a very small portion of the incident light is scattered in other directions. One example of a highly reflective or specular navigation surface 104 is a glass surface. Other embodiments may include other types of specular navigation surfaces 104.

The distance between the optical navigation device 102 and the navigation surface 104 may vary depending on the application for which the optical navigation device 102 is used. In surface navigation applications, the optical navigation device 102 may be relatively close to the navigation surface 104. For example, a housing of the optical navigation device 102 may be in direct, physical contact with the navigation surface 104. In the embodiment of FIG. 1, stand-off structures 132 are attached to the housing of the optical navigation device 102 and are in direct, physical contact with the navigation surface 104. In an embodiment, the body of the optical navigation device 102 is a few millimeters above the navigation surface 104, with only the stand-off structures 132 being in direct, physical contact with the navigation surface 104.

The depicted optical navigation device 102 includes a light source 106, an optical navigation circuit 108, and a microcontroller 110. The optical navigation device 102 also includes optical elements 112 and 114 (e.g., lenses). Other embodiments may include fewer or more components. For example, some embodiments of the optical navigation device 102 may exclude one or more of the optical elements 112 and 114, while other embodiments include additional optical elements.

In one embodiment, the light source 106 is an incoherent light source. In another embodiment, the light source 106 is a coherent light source. In one embodiment, the light source 106 is a laser. For example, the light source 106 may be a vertical cavity surface emitting laser (VCSEL) or a light emitting diode (LED). Alternatively, the light source 106 may be another type of laser or other light source. In some embodiments, the light emitted by the light source 106 is collimated. In other embodiments, the light source 106 emits light that is not collimated.

In general, the light source 106 directs light toward the navigation surface 104 to illuminate a portion of the navigation surface 104. If the navigation surface 104 is substantially specular, then the light beam reflects off of the navigation surface 104 along a specular reflection path. In the embodiment of FIG. 1, the incident light (i.e., the light traveling toward the navigation surface 104) passes through the optical element 112, which may be, for example, a focusing lens. Similarly, the reflected light beam (i.e., the light reflected from the navigation surface 104) passes through the optical element 114, which may be, for example, a focusing lens.

If there are any surface reflection features such as irregularities, dust, or scratches at the navigation surface 104, then some of the incident light may be reflected and scattered along one or more scattered light paths which are slightly or greatly offset from the specular reflection path. Essentially, any path which is not the specular reflection path may be considered a scattered light path. Although there may be many types of surface reflection features which scatter the reflected light in different directions, some examples of surface reflection features include particles (e.g., dust) on the navigation surface 104, aberrations (e.g., scratches) in the navigation surface 104, irregularities at the navigation surface 104, as well as imperfections below or beneath the navigation surface 104. In the case of diffuse reflection off of a surface reflection feature, the reflected light may be diffused, or scattered in substantially all directions.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light 113 that is emitted toward the navigation surface 104. Light 115 from the navigation surface 104 is reflected back into the optical navigation device 102.

The depicted image acquisition system 120 includes an image sensor 126 and an analog-to-digital converter (ADC) 130. The image sensor 126 includes an array of pixel elements or "pixels" 128, with each pixel being a distinct photosensor or photodetector. As an example, the image sensor 126 may include a 16×16, a 22×22, or a 32×32 array of pixels configured to detect light that is reflected from the navigation surface 104. In one embodiment, the image sensor 126 generates a plurality of electrical signals corresponding to light intensity of the reflected light that is incident on the pixel array 128. Each of the electrical signals corresponds to one of the pixels of the pixel array 128. In one embodiment, the optical element 114 facilitates resolution of microscopic surface images at the pixel array 128.

The analog-to-digital converter (ADC) 130 converts the plurality of electrical signals, received from the pixel array 128 of the image sensor 126, from analog signals to digital signals. The digital signal generated from each pixel is referred to as a pixel value. In an embodiment, the pixel values are quantified as 8-bit binary digital values that range from 0-255. Although the pixel values are quantified as 8-bit binary digital values that range from 0-255, the pixel values can be quantified with a different number of bits or in a different way. The analog-to-digital converter 130 passes the pixel values to the digital signal processor 122.

Image information is captured by the pixel array 128 of the image sensor 126 in time-specific frames. A frame of image information includes a set of simultaneously captured pixel values for each distinct pixel in the pixel array 128. Image frames captured by the pixel array 128 include data that represents features on the navigation surface 104. The rate of image frame capture, the pixel exposure time, and the tracking resolution is programmable.

A motion tracking engine (not shown) within the digital signal processor 122 compares successive frames of image information from the pixel array 128 to determine the movement of image features between frame capture. In an embodiment, the motion tracking engine determines movement by correlating common features that exist in successive frames of image information generated by the pixel array 128. More detailed descriptions of exemplary optical navigation movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein. The movement between frames of image information is expressed in terms of movement vectors in, for example, X and Y directions (e.g., Δx and Δy), which are parallel to the plane of the navigation surface. The movement vectors are then used to determine the movement of the optical navigation device relative to the navigation surface. This movement is ultimately translated to cursor movement on a display of a host computer system.

After the digital signal processor 122 receives the pixel values from the analog-to-digital converter 130 of the image acquisition system 120, the digital signal processor 122 may perform additional processing using the pixel values. The digital signal processor 122 then transmits one or more signals to the microcontroller 110. Examples of types of signals transmitted from the digital signal processor 122 of the optical navigation circuit 108 to the microcontroller 110 include "counts" or channel quadrature signals based on Δx and Δy relative displacement values. These signals, or other signals, may be indicative of a movement of the optical navigation device 102 relative to the navigation surface 104 and are typically used to move a cursor on a display of a host computer system. Other embodiments of the digital signal processor 122 may transmit other types of signals to the microcontroller 110. In one embodiment, the microcontroller 110 implements a variety of functions, including transmitting data to and receiving data from the host computer system.

In one embodiment, the digital signal processor 122 determines the surface quality or "SQUAL" of a frame of image information. The SQUAL of a frame of image information is an indication of how many features exist in the frame of image information. A feature is generated in the frame of image information as a result of light reflecting from an uneven or textured navigation surface. In an embodiment, a "SQUAL value" represents the number of features that are found in a frame of image information. In general, the reliability of motion tracking increases as the number of features increases. That is, the reliability of motion tracking increases as the SQUAL value increases. If the SQUAL value falls below a certain level, motion tracking can become unreliable.

In an embodiment, a SQUAL threshold can be established. The SQUAL threshold is set at a SQUAL value above which motion tracking is deemed to be reliable and below which motion tracking is deemed to be unreliable. Proper SQUAL values can be found, for example, by experimentation. In order to achieve reliable motion tracking, the SQUAL value is calculated for each frame of image information and compared to the SQUAL threshold. A frame of image information is only used for motion tracking if the frame's SQUAL value is above the SQUAL threshold.

In operation, the SQUAL values of successive frames stay relatively stable as the optical navigation device 102 moves along a navigation surface 104. However, the SQUAL values tend to drop when the optical navigation device is lifted from the navigation surface. This is the case because of pixel saturation and because the light incident on the image sensor loses focus, effectively washing out features that may have been present if the optical navigation device was sitting on the navigation surface.

Under normal operating conditions, the optical navigation device 102 is moved on the navigation surface 104 in order to control a cursor on a display. When the optical navigation device is lifted from the navigation surface, it is desirable for the cursor to stop moving. However, for various reasons that are described below, an optical navigation device can produce unwanted motion signals, which translate to unwanted cursor movement, when the optical navigation device is lifted from the navigation surface.

Figure 2A:
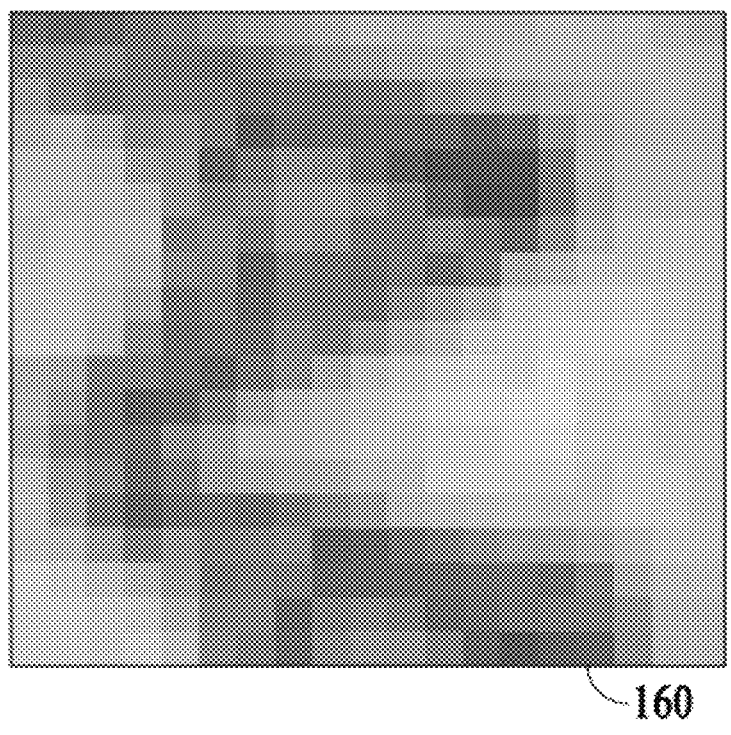
FIG. 2A depicts a frame of image information that is captured when an optical navigation device is moved laterally on a navigation surface.
Figure 2B:
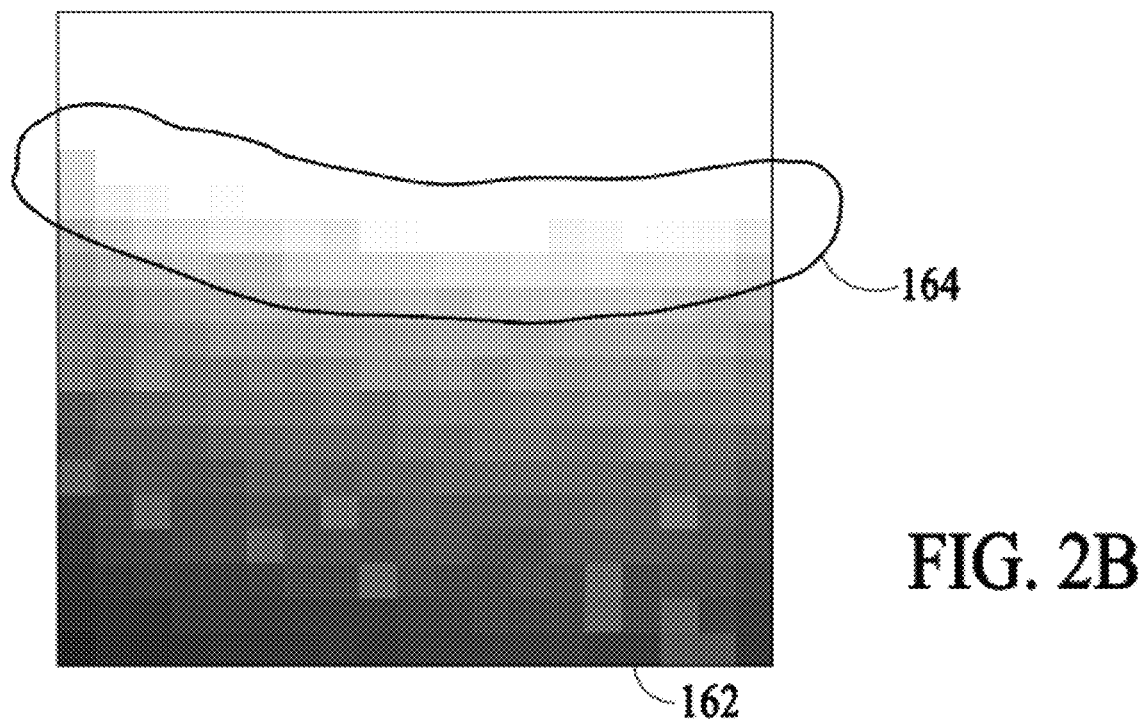
FIG. 2B depicts a frame of image information, captured during a lift condition, in which some pixels have become saturated and a saturation boundary has developed.

When the optical navigation device 102 is moved laterally on the navigation surface 104, the quantity of light received by the pixels of the image sensor does not vary widely. FIG. 2A depicts a frame of image information 160 that is captured when the optical navigation device is moved laterally on the navigation surface. Because the quantity of light received by the image sensor does not exhibit wide differences, the exposure time of the image sensor can be adjusted to capture an ideal quantity of light across the pixel array. However, when the optical navigation device is lifted from the navigation surface, the tracking features become unfocused and it is often the case that stark differences arise between the pixel values of "bright" pixels and the pixel values of "dark" pixels, where the "bright" pixels are pixels that are exposed to a relatively high amount of incident light and the "dark" pixels are pixels that are exposed to a relatively low amount of incident light. The stark difference between pixel values can cause some pixels to become saturated, e.g., the pixel values are pinned at the maximum value, because the exposure time cannot be adjusted to accommodate for the different quantities of incident light. Pixel saturation can occur when the navigation surface is paper printed with text or half tone paper because these surfaces have many areas where, during a lift, the image sensor sees small parts of white against a large area of black. When a group of pixels becomes saturated, a saturation boundary may develop. FIG. 2B depicts a frame of image information 162, captured during a lift condition, in which some pixels have become saturated and a saturation boundary (indicated by lined area 164) has developed. Although the saturation boundary does not result from the expected feature-based scattering of light, the saturation boundary can be interpreted as a feature boundary and the optical navigation device may generate motion tracking information based on the saturation boundary being interpreted as a tracking feature. The generated motion tracking information may result in unwanted movement of the cursor.

In order to avoid unwanted movement of the cursor during a lift condition, the level of saturation of the image sensor 126 is used as an indicator to control motion tracking. For example, if too many pixels in the image sensor are saturated, it is an indication that the optical navigation device 102 has been lifted from the navigation surface 104. Based on the level of saturation of the image sensor, an adjustment can be made to the tracking algorithm to reduce the occurrence of unwanted cursor movement. In an embodiment, the SQUAL threshold that is used by the optical navigation device to control motion tracking is increased when the image sensor is too saturated in order to reduce the occurrence of unwanted cursor movement.

Figure 3A:
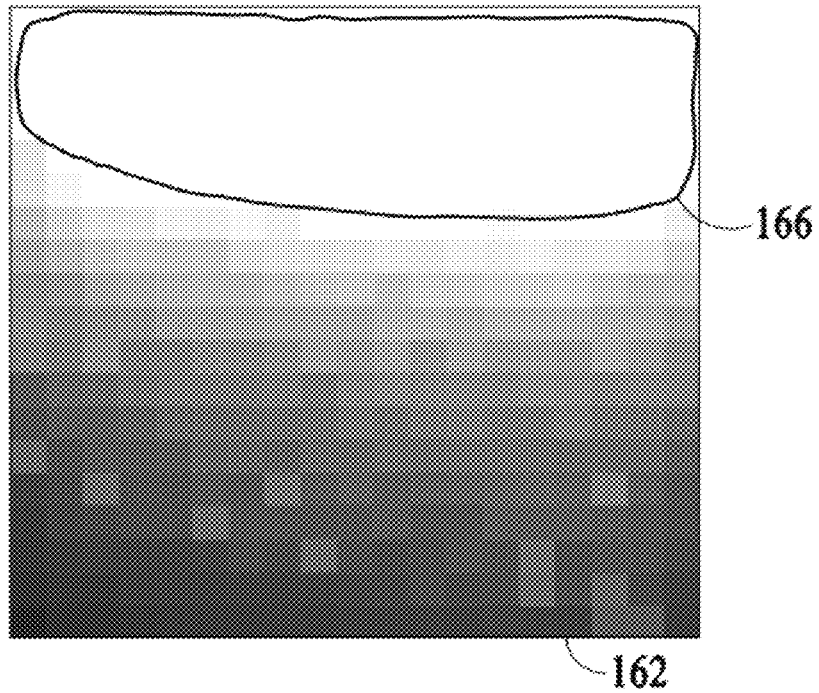
FIG. 3A illustrates the approximate area of the frame of image information from FIG. 2B within which saturated pixels are located when a pixel saturation threshold is set at 254.

In an embodiment, in order to quantify the level of saturation of the entire pixel array 128, it is first necessary to determine whether an individual pixel is saturated. In general, a saturated pixel is a pixel that has reached the maximum possible value that is allowed by the ADC 130. In an embodiment, whether or not a pixel is to be considered saturated is based on the pixel value of the corresponding pixel. For example, the pixel value for each pixel is compared to a pixel saturation threshold to determine if the pixel is saturated. In an embodiment in which the pixel values range from 0-255, a pixel value of 254 is set as the pixel saturation threshold such that any pixel having a pixel value of 255, the maximum possible pixel value, is considered a saturated pixel. FIG. 3A illustrates the approximate area of the frame of image information 162 from FIG. 2B within which saturated pixels are located when the pixel saturation threshold is set at 254. That is, all of the pixels within the lined area 166 are considered saturated pixels.

Figure 3B:
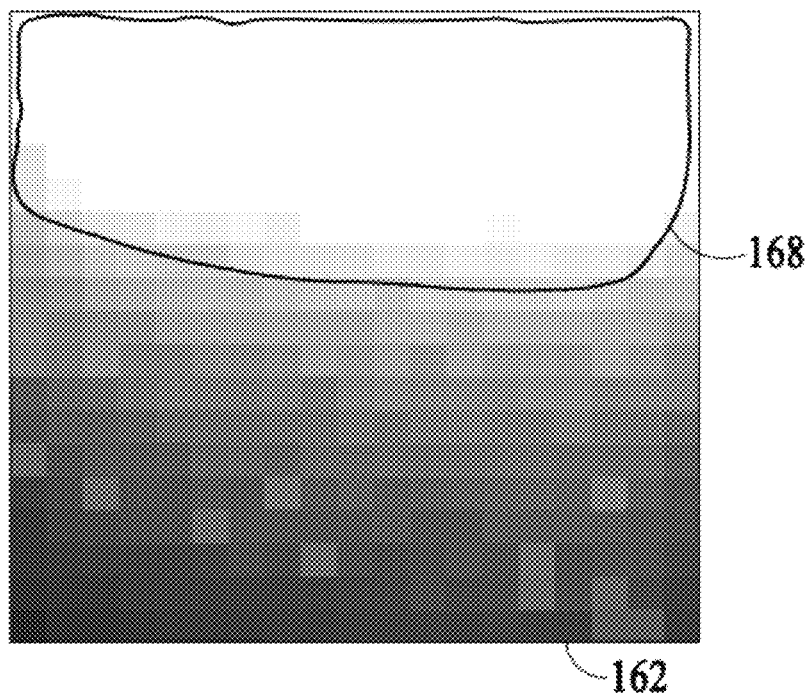
FIG. 3B illustrates the approximate area of the frame of image information from FIG. 2B within which saturated pixels are located when the pixel saturation threshold is set at 128.

In another embodiment, a pixel value of less than the maximum is set as the pixel saturation threshold. For example, the pixel saturation threshold could be set at 128 and any pixel having a pixel value greater than 128 is considered a saturated pixel. FIG. 3B illustrates the approximate area of the frame of image information 162 from FIG. 2B within which saturated pixels are located when the pixel saturation threshold is set at 128. That is, all of the pixels within the lined area 168 are considered saturated pixels.

In an embodiment, it is desirable that the SQUAL threshold is only adjusted when the optical navigation device 102 is lifted from the navigation surface 104. The level of saturation of the image sensor 126 is used as an indicator that the optical navigation device is lifted from the navigation surface. Experimental data can be used to determine the level of saturation of the image sensor that is experienced when the optical navigation device is lifted from the navigation surface. Experimental data has shown for various different navigation surfaces that a saturation level of approximately 2% of the pixels in a pixel array is a reliable indicator that the optical navigation device is lifted from the navigation surface. For example, a 22×22 pixel array is considered to be saturated for purposes of SQUAL threshold adjustment if 10 of the 484 pixels (i.e., 2%) are found to be saturated. Although a saturation level of 2% is a reliable indicator, in other embodiments, a level of saturation in the range of 1-4% is a reliable indicator that the optical navigation device is lifted from the navigation surface. As the saturation level increases, there is a higher chance that the optical navigation device will produce unwanted cursor movement.

Certain information can be obtained for each frame of image information in real-time as the optical navigation device 102 moves over the navigation surface 104. For example, the following characteristics can be obtained for a frame of image information:

"Average_Pixel"—the average pixel value of the all of the pixels of the image sensor; and "Maximum_Pixel"—the highest pixel value of any pixel of the image sensor.

Actual statistics can be collected for an optical navigation device during navigation on various different surfaces. For example, when the image sensor has a certain number of saturated pixels, the corresponding SQUAL value can be plotted against the difference between the Maximum_Pixel and the Average_Pixel. The difference between Maximum_Pixel and the Average_Pixel gives an indication of the overall contrast level of the features that exist in the frames of image information. Other statistics may be used to give an indication of the overall contrast level of the features that exist in the frames of image information. In another embodiment, a different characteristic of the frames of image information may be used evaluate the performance of the optical navigation device.

Figure 4:
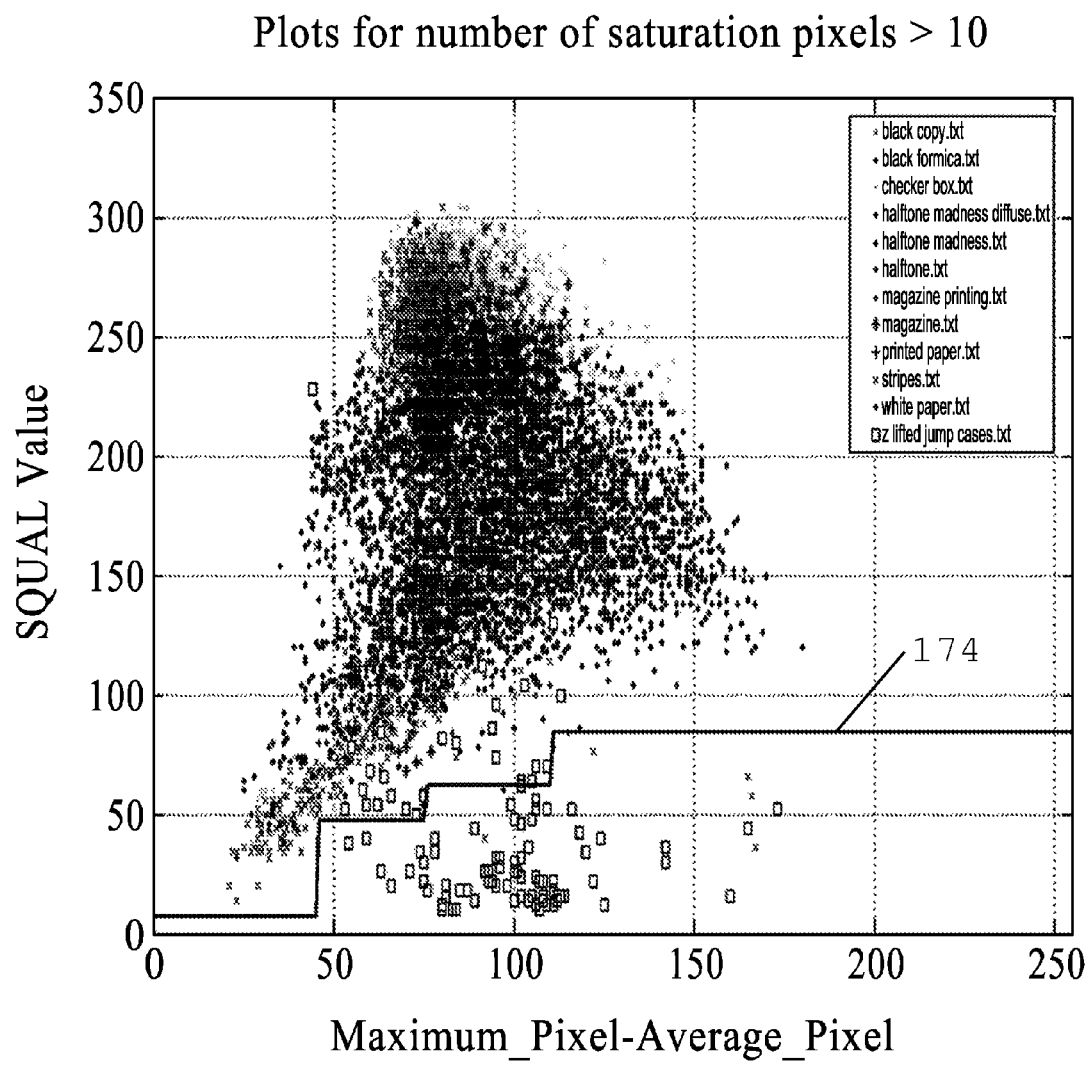
FIG. 4 is a plot of SQUAL value versus the difference between the Maximum_Pixel and the Average_Pixel for various navigation surfaces when there are more than 10 saturated pixels in a frame of image information with 484 total pixels.

FIG. 4 is a plot of SQUAL value versus the difference between the Maximum_Pixel and the Average_Pixel (Maximum_Pixel–Average_Pixel) for various navigation surfaces when there are more than 10 saturated pixels in a frame of image information (484 total pixels). In FIG. 4, the plot includes data for the following navigation surfaces: black copy (e.g., diffuse black image printed using laser printer), black Formica, checker box (e.g., alternating image of black and white boxes), halftone madness (e.g., a combination of halftone patterns of varying weight and density), halftone (e.g., black dots of fixed pitch on a white background), halftone, magazine (e.g., glossy color printed magazine surface), printed paper (e.g., 80 gm white paper with black printed sentences), stripes, and white paper. Additionally, the plot indicates the data points where the optical navigation device exhibits unwanted cursor movement while the optical navigation device is lifted. These data points are uniquely identified by squares. Typically, the data points that represent unwanted movement result from surfaces that have unique characteristics. For example, as explained above, printed paper with text or halftone paper can produce unwanted cursor movement because the image sensor sees small parts of white against a large black area.

FIG. 4 also depicts a SQUAL threshold 174. Instead of setting the SQUAL threshold at a single value for all conditions, the SQUAL threshold can be set based on performance data from actual motion tracking conditions such as the data in FIG. 4. In an embodiment, the SQUAL threshold is set to various different levels that are selected so that the optical navigation device does not output motion tracking information when the current conditions are such that unwanted movement is more likely to occur. As indicated in FIG. 4, the instances of unwanted movement occur more often when Maximum_Pixel−Average_Pixel is greater than 50 and when the SQUAL value is less than 100. In an embodiment, the SQUAL threshold is set to take into consideration actual performance data. For example, the SQUAL threshold is set to increase step-wise with the increase in Maximum_Pixel−Average_Pixel.

Figures 5, 7:
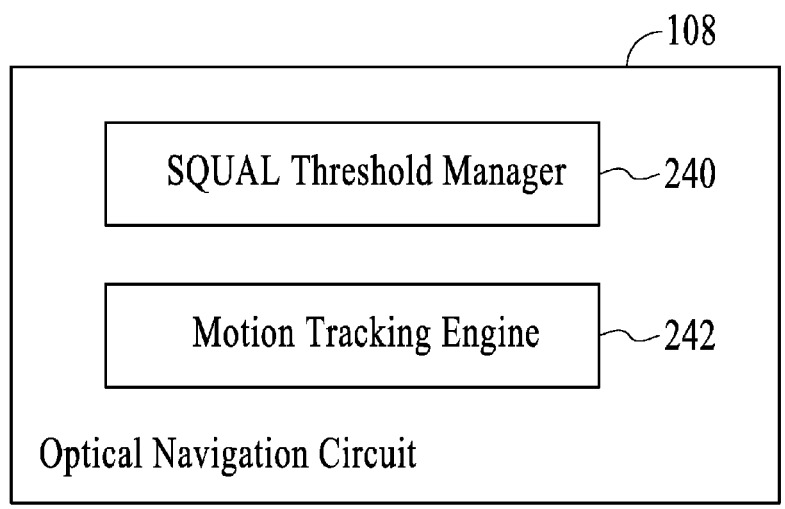
FIG. 5 is a table that reflects the desired SQUAL threshold as a function of Maximum_Pixel−Average_Pixel as depicted in FIG. 4.
FIG. 7 depicts an embodiment of the optical navigation circuit from FIG. 1.

FIG. 5 is a table that reflects the desired SQUAL threshold as a function of Maximum_Pixel−Average_Pixel as depicted in FIG. 4. The table can be used to set the SQUAL threshold in a dynamic manner as a function of the real-time value of Maximum_Pixel−Average_Pixel. The table indicates that the SQUAL threshold starts at a SQUAL value of 8. If the value of Maximum_Pixel−Average_Pixel is 45 or less, then the SQUAL threshold stays at 8. If the value of Maximum_Pixel−Average_Pixel is in the range of 46-75, then the SQUAL threshold is increased from 8 to 48, if the value of Maximum_Pixel−Average_Pixel is in the range of 76-110, then the SQUAL threshold is increased from 8 to 60, and if the value of Maximum_Pixel−Average_Pixel is 111 or more, then the SQUAL threshold is increased from 8 to 80. In the above-described example, a Maximum_Pixel−Average_Pixel value of 45 is a difference threshold ("Difference_Threshold") above which an adjustment is made to the SQUAL threshold.

As indicated with reference to FIGS. 4 and 5, the SQUAL threshold can be adjusted in response to real-time characteristics of the image information in order to reduce the chance of the optical navigation device 102 outputting a motion tracking signal that causes unwanted movement of a cursor. In particular, the SQUAL threshold is adjusted in response to the level of saturation of the image sensor and in response to the value of Maximum_Pixel−Average_Pixel. An example of pseudo code that can be used to implement such an algorithm is as follows:

```
If (Saturated_Pixel_Count > Number_of_Saturated_Pixels_Threshold)
    If (Maximum_Pixel − Average_Pixel > Difference_Threshold)
        Increase the SQUAL Threshold
If (Current SQUAL < SQUAL Threshold) Set current image frame as a
low SQUAL frame
```

Using the above-provided pseudo code, frames of image information that are set as "low SQUAL" frames are not used for motion tracking.

Figure 6:
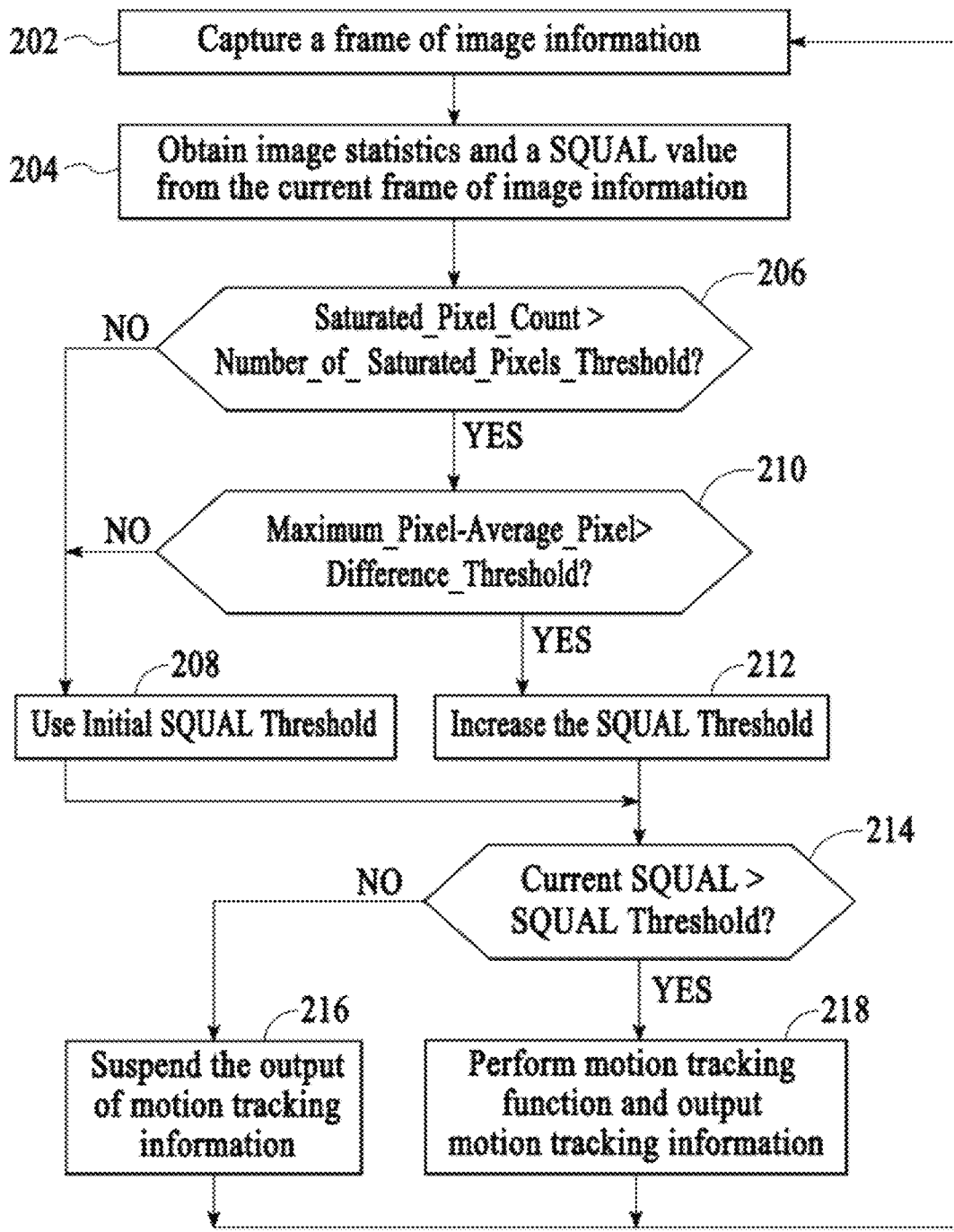
FIG. 6 is a process flow diagram of a technique for tracking movement between a surface and an optical navigation device.

FIG. 6 is a process flow diagram of a technique for tracking movement between a surface and an optical navigation device. The technique implements an algorithm similar to the above-provided pseudo code. At block 202, a frame of image information is captured by the optical navigation device. At block 204, image statistics and a SQUAL value are obtained from the frame of image information. At decision point 206, it is determined whether the number of saturated pixels, "Saturated_Pixel_Count," is greater than the "Number_of_Saturated_Pixels_Threshold." If the number of saturated pixels, "Saturated_Pixel_Count," is not greater than the "Number_of_Saturated_Pixels_Threshold," then at block 208, the initial SQUAL threshold is used as the SQUAL threshold. If the number of saturated pixels, "saturated_pixel_count," is greater than the "Number_of_Saturated_Pixels_Threshold," then the process moves to decision point 210.

At decision point 210, it is determined whether Maximum_Pixel−Average_Pixel is greater than the Difference_Threshold. If Maximum_Pixel−Average_Pixel is not greater than the Difference_Threshold, then at block 208, the initial SQUAL threshold is used as the SQUAL threshold. If Maximum_Pixel−Average_Pixel is greater than the Difference_Threshold, then at block 212, the SQUAL threshold is increased. In an embodiment, the SQUAL threshold is increased as a function of Maximum_Pixel−Average_Pixel as indicated in FIGS. 4 and 5.

At decision point 214, it is determined if the current SQUAL value is greater than the SQUAL threshold. If the current SQUAL value is not greater than the SQUAL threshold, then at block 216, the output of motion tracking information is suspended and the process returns to block 202. If the current SQUAL value is greater than the SQUAL threshold, then at block 218, motion tracking is performed using the frame of image information and motion tracking information is output.

Although some examples of image information characteristics and experimental data are described above, other characteristics of the frames of image data may be used to dynamically adjust the SQUAL threshold to reduce the occurrence of unwanted cursor movement during a lift condition.

FIG. 7 depicts an embodiment of the optical navigation circuit 108 from FIG. 1. The optical navigation circuit depicted in FIG. 7 includes a SQUAL threshold manager 240 and a motion tracking engine 242. The SQUAL threshold manager performs the SQUAL threshold management functions as described above, including for example, counting the number of saturated pixels, comparing the number of saturated pixels to the number of saturated pixels threshold, finding the Maximum_Pixel, calculating the Average_Pixel, find the difference between the Maximum_Pixel and the Average_Pixel, and adjusting the SQUAL threshold as a function of the aforementioned characteristic information. The motion tracking engine performs the motion tracking functions as described above. The SQUAL threshold manager and the tracking engine may be embodied in hardware, software, firmware, or a combination thereof.

Although the technique for tracking movement between a surface and an optical navigation device is described in the context of an optical mouse, the technique applies also to optical finger navigation. For example, optical navigation in which the navigation surface is a finger of a user and the optical navigation device is integrated with a host computer such as a laptop computer, a pad computer, or a hand-held computing device such as a Smartphone.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for tracking movement between a surface and an optical navigation device, the optical navigation device having an image sensor that includes an array of pixels, the method comprising:
   acquiring image information, the image information including pixel values that correspond to the pixels;
   calculating a surface quality (SQUAL) value from the image information;
   determining a level of saturation of the pixel array from pixel values of the image information;
   comparing the determined level of saturation of the pixel array to a saturation threshold;
   increasing a SQUAL threshold if the determined level of saturation of the pixel array is greater than the saturation threshold; and
   deciding whether or not to output motion tracking information in response to a comparison of the SQUAL value to the SQUAL threshold.

2. The method of claim 1, further comprising:
   outputting motion tracking information if the SQUAL value is above the SQUAL threshold; and
   suspending the output of motion tracking information if the SQUAL value is below the SQUAL threshold.

3. The method of claim 1, further comprising:
   finding the highest pixel value in the image information;
   calculating the average pixel value for the image information;
   subtracting the highest pixel value from the average pixel value; and
   comparing the difference to a difference threshold; and
   increasing the SQUAL threshold only if the determined level of saturation is greater than the saturation threshold and the difference between the highest pixel value and the average pixel value is greater than the difference threshold.

4. The method of claim 1, wherein determining a level of saturation of the pixel array comprises counting the number of pixel values that are at a maximum value.

5. The method of claim 4, wherein the SQUAL threshold is increased as a function of the magnitude of the difference between the highest pixel value and the average pixel value.

6. The method of claim 4, wherein the maximum value is a function of the number of bits associated with each pixel value.

7. The method of claim 1, wherein determining a level of saturation of the pixel array comprises counting the number of pixel values that are above a pixel saturation threshold.

8. A method for tracking movement between a surface and an optical navigation device, the optical navigation device having an image sensor that includes an array of pixels, the method comprising:
   setting a surface quality (SQUAL) threshold;
   acquiring image information from the image sensor, the image information including pixel values that correspond to the pixels;
   obtaining at least one characteristic of the image information;
   calculating a SQUAL value from the image information;
   deciding whether or not to increase the SQUAL threshold in response to the characteristic of the image information;
   after it is decided whether or not to increase the SQUAL threshold, comparing the SQUAL value to the SQUAL threshold; and
   deciding whether or not to output motion tracking information in response to the comparison;
   wherein obtaining at least one characteristic of the image information comprises:
   counting the number of pixel values that are saturated to determine a level of saturation of the pixel array;
   comparing the saturation level to a saturation threshold;
   finding the highest pixel value in the image information;
   calculating the average pixel value for the image information;
   subtracting the highest pixel value from the average pixel value;
   comparing the difference to a difference threshold; and
   increasing the SQUAL threshold from the current SQUAL threshold only if the determined level of saturation is greater than the saturation threshold and the difference between the highest pixel value and the average pixel value is greater than the difference threshold.

9. The method of claim 8, wherein the SQUAL threshold is increased as a function of the magnitude of the difference between the highest pixel value and the average pixel value.

10. An optical navigation device comprising:
    an image sensor that outputs image information, the image sensor having an array of pixels that generate corresponding pixel values;
    a surface quality (SQUAL) threshold management engine, the SQUAL threshold management engine configured to:
      determine a level of saturation of the pixel array from the pixel values of the image information;
      compare the determined level of saturation to a saturation threshold;
      increase a SQUAL threshold if the determined level of saturation is greater than the saturation threshold; and
    a motion tracking engine configured to:
      generate a SQUAL value from the image information;
      compare the SQUAL value to the SQUAL threshold;
      output motion tracking information if the SQUAL value is above the SQUAL threshold; and
      suspend the output of motion tracking information if the SQUAL value is below the SQUAL threshold.

11. The optical navigation device of claim 10, wherein the SQUAL threshold management engine is further configured to:
    find the highest pixel value in the image information;
    calculate the average pixel value for the image information;
    subtract the highest pixel value from the average pixel value; and
    compare the difference to a difference threshold; and
    increase the SQUAL threshold only if the determined level of saturation is greater than the saturation threshold and the difference between the highest pixel value and the average pixel value is greater than the difference threshold.

12. The optical navigation device of claim 11, wherein the SQUAL threshold is increased as a function of the magnitude of the difference between the highest pixel value and the average pixel value.

13. The optical navigation device of claim 10, wherein determining the level of saturation of the pixel array comprises counting the number of pixel values that exceed a pixel saturation threshold.

* * * * *